(12) United States Patent
Saxe

(10) Patent No.: US 9,777,702 B2
(45) Date of Patent: Oct. 3, 2017

(54) GENERATING ENERGY FROM CHANGES IN ATMOSPHERIC PRESSURE

(71) Applicant: Joshua E. Saxe, Palm Beach, FL (US)

(72) Inventor: Joshua E. Saxe, Palm Beach, FL (US)

( * ) Notice: Subject to any disclaimer, the term of this patent is extended or adjusted under 35 U.S.C. 154(b) by 169 days.

(21) Appl. No.: 14/650,978

(22) PCT Filed: Dec. 11, 2013

(86) PCT No.: PCT/US2013/074303
§ 371 (c)(1),
(2) Date: Jun. 10, 2015

(87) PCT Pub. No.: WO2014/093441
PCT Pub. Date: Jun. 19, 2014

(65) Prior Publication Data
US 2015/0330357 A1 Nov. 19, 2015

Related U.S. Application Data

(60) Provisional application No. 61/737,185, filed on Dec. 14, 2012.

(51) Int. Cl.
*F03B 17/02* (2006.01)
*F03G 7/04* (2006.01)
*F03G 7/06* (2006.01)

(52) U.S. Cl.
CPC .............. *F03B 17/025* (2013.01); *F03G 7/04* (2013.01); *F03G 7/06* (2013.01)

(58) Field of Classification Search
CPC .......... F03B 13/00; F03B 13/10; F03B 17/00; F03B 17/02; F03B 17/025; F03G 7/04; F03G 7/06; Y02E 10/20
USPC .................................................... 60/495, 496
See application file for complete search history.

(56) References Cited

U.S. PATENT DOCUMENTS

| | | | |
|---|---|---|---|
| 6,546,726 B1 * | 4/2003 | Tomoiu | F03B 17/02 60/495 |
| 7,012,341 B2 | 3/2006 | Matsubara | |
| 7,598,624 B2 | 10/2009 | Loui et al. | |
| 7,644,805 B2 | 1/2010 | Chiu | |

(Continued)

FOREIGN PATENT DOCUMENTS

| | | |
|---|---|---|
| FR | 2883048 A1 | 9/2006 |
| FR | 2971559 A1 | 8/2012 |
| JP | 2008286177 A | 11/2008 |

OTHER PUBLICATIONS

Patent Cooperation Treaty, Notification of Transmittal of The International Search Report and The Written Opinion of The International Searching Authority for PCT/US2013/074303 mailed Mar. 27, 2014, 6 pages.

(Continued)

*Primary Examiner* — Phutthiwat Wongwian
*Assistant Examiner* — Loren Edwards
(74) *Attorney, Agent, or Firm* — Hoffman Warnick LLC

(57) ABSTRACT

A system and method for generating energy by exploiting changes in atmospheric pressure. A system is provided that includes a pair of submerged vessels, each vessel containing a fluid; a mechanism for alternatively raising and lowering the submerged vessels to cause the fluid to expand and contract; a system for capturing mechanical energy resulting from the expansion and/or contraction; and a system for converting the mechanical energy to electrical energy.

18 Claims, 6 Drawing Sheets

(56) References Cited

U.S. PATENT DOCUMENTS

| | | |
|---|---|---|
| 7,735,318 B1 * | 6/2010 | Curiel .................. F03B 17/02 60/495 |
| 7,795,748 B2 | 9/2010 | DeAngeles |
| 8,146,361 B2 | 4/2012 | Jin |
| 2007/0018458 A1 | 1/2007 | Martinez |
| 2008/0315590 A1 | 12/2008 | Reyes-Florido |
| 2011/0070032 A1 | 3/2011 | Frazier et al. |
| 2011/0126538 A1 | 6/2011 | Kim |
| 2011/0260471 A1 | 10/2011 | Ham |

OTHER PUBLICATIONS

Elementarny uchebnik fiziki, pod red. G. S. Landsberga. Tom I. Mekhanika, teplota. I-20 Molekulyarnaya fizika. Moskva, AOZT "SHRAIK", 1995, p. 210 (No English Translation available).
Kabardin 0. F. Fizika. Spravochnye materialy. Moskva, "Prosveschenie", 1991, I-20 p. 51-53 (No English Translation available).

* cited by examiner

GENERATING ENERGY FROM CHANGES IN ATMOSPHERIC PRESSURE

CLAIM OF PRIORITY

The present application claims the benefit of U.S. Provisional Patent Application entitled "GENERATING ENERGY FROM CHANGES IN ATMOSPHERIC PRESSURE," Ser. No. 61/737,185, filed on Dec. 14, 2012, the contents of which is hereby incorporated by reference.

TECHNICAL FIELD

The present invention relates generally to storing, managing and generating energy from changes in atmospheric pressure, and more particularly relates to an underwater system and method for generating energy by exploiting changes in atmospheric pressure.

BACKGROUND

With the continuing need to find new methods for generating and managing energy sources, various approaches have been considered that utilize underwater systems. For instance, systems have been proposed that store compressed air underwater as a means for storing energy, e.g., generated by solar or wind energy. Other approaches have proposed tank pairs linked by a cable that alternatively raise and lower in the water using an underwater air refilling station to create buoyancy and generate mechanical energy. Still other techniques attempt to capture energy from tides.

SUMMARY OF THE INVENTION

The present invention provides an underwater system and method for generating energy utilizing changing atmospheric pressure. In one aspect, the invention provides a system for managing energy, comprising: a pair of submerged vessels, each vessel containing a fluid; a mechanism for alternatively raising and lowering the vessels to cause the fluid to expand and contract; a system for capturing mechanical energy resulting from at least one of an expansion or contraction of the fluid; and a system for converting the mechanical energy to electrical energy.

In a second aspect the invention provides a method for generating energy, comprising: providing a pair of submerged vessels, each vessel containing a fluid; alternatively raising and lowering the vessels to cause the fluid to expand and contract; capturing mechanical energy resulting from at least one of an expansion or contraction of the fluid; and converting the mechanical energy to electrical energy.

In a third aspect, the invention provides a system for managing energy, comprising: a set of submerged vessels, each vessel containing a fluid; a counterbalance couple to each of the vessels; a mechanism for alternatively raising and lowering the set of vessels and the counterbalance to cause the fluid to expand and contract; a system for capturing mechanical energy resulting from at least one of an expansion or contraction of the fluid; and a system for converting the mechanical energy to electrical energy.

BRIEF DESCRIPTION OF THE DRAWINGS

These and other features of this invention will be more readily understood from the following detailed description of the various aspects of the invention taken in conjunction with the accompanying drawings.

Figure 1:
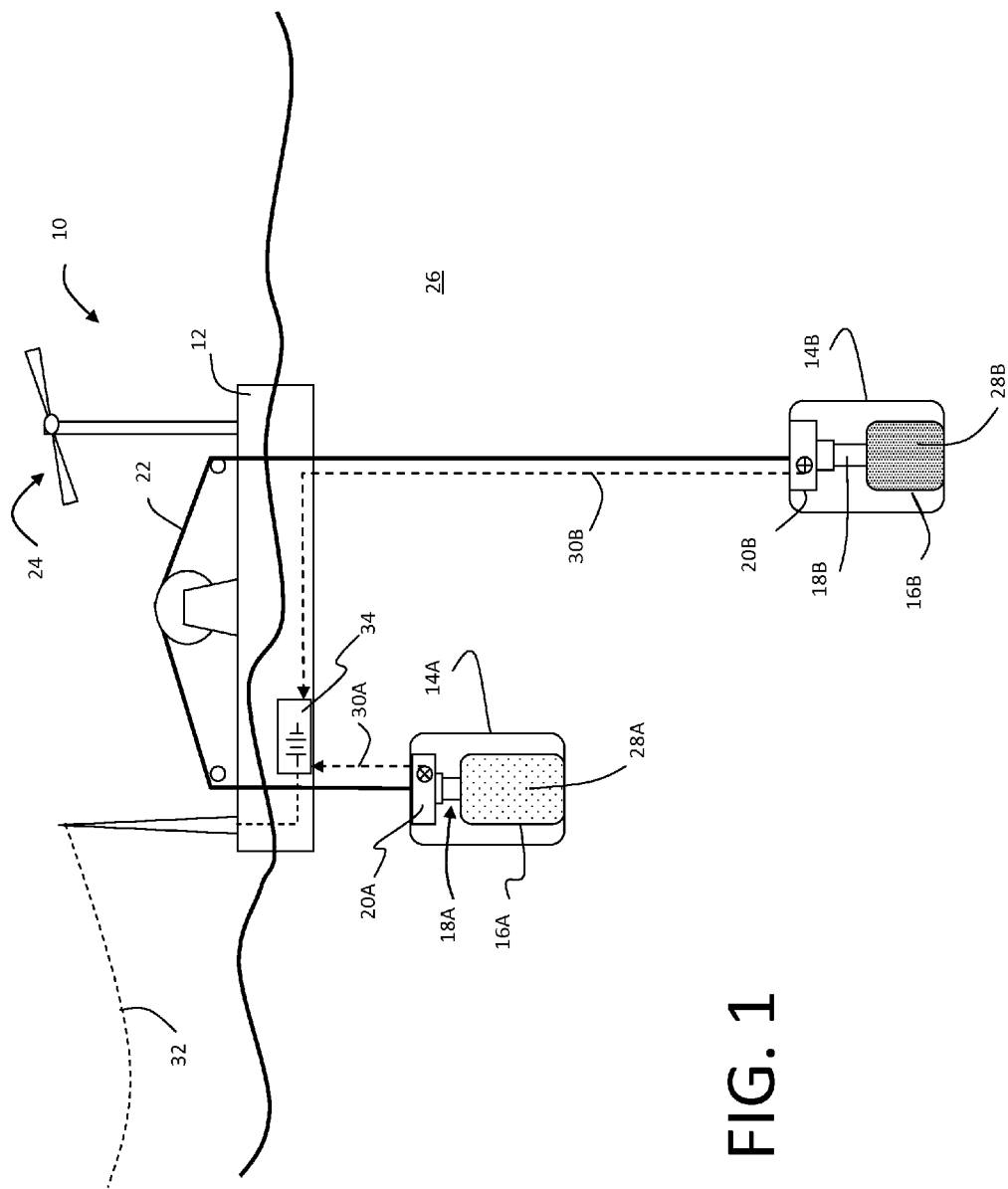
FIG. 1 depicts a simplified schematic drawing of a system for managing and generating power from the expansion and compression of a fluid resulting from atmospheric pressure changes in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring to FIG. 1, an illustrative underwater power management system 10 is depicted for storing energy and generating electrical energy. System 10 generally includes a platform 12 that resides at or near the surface of a body of water 26 such as an ocean, lake, sea, etc. Submerged from the platform 12 via a cable 22 is a counterbalanced pair of vessels 14A, 14B. In this illustrative embodiment, each vessel 14A, 14B includes a pliable container 16A, 16B of fluid 28A, 28B, a mechanical linkage 18A, 18B and an electromechanical generator 20A, 20B, respectively.

During operation, the counterbalanced pair of vessels 14A, 14B are oppositely raised and lowered in the body of the water 26. Because each vessel has approximately the same mass, little energy is required to raise and lower the vessels. A small motor, e.g., driven by a wind turbine 24, solar panel, wave energy collector, etc., may provide a mechanism, along with gravity, to raise and lower vessels 14A, 14B at the respective ends of cable 22. As described below, a buoyancy tank may be utilized as well to assist in ascent.

As noted, the present invention exploits changing atmospheric pressure to generate electrical energy. Approximately every 30 feet of depth results in one "atmosphere" of pressure. As a vessel is lowered deeper into the water, each additional atmosphere creates additional pressure on the vessel and its contents. Accordingly, as vessel 14A is raised and vessel 14B is lowered: (a) the atmospheric pressure on the vessel 14A decreases causing fluid 28A and pliable container 16A to expand; and (b) the atmospheric pressure on the vessel 14B increases causing fluid 28B and pliable container 16B to contract. Pliable container 16A, 16B may comprise any closed or open structure that can store a fluid. In this embodiment, pliable container is capable of expanding and contracting as the fluid 28A, 28B expands and contracts. Fluid 28A, 28B may comprise any gaseous mixture, e.g., air, or liquid substance that responds to changing atmospheric pressure.

In this illustrative embodiment, the expansion/contraction action in-turn causes a force on the mechanical linkage 18A, 18B. Mechanical linkage may, for instance, comprise a rod, piston, spring, wheel, turbine, etc., whose force is communicated to a generator, in this case, electromechanical generator 20A, 20B, which converts the mechanical force into electrical energy. In an alternative embodiment, the mechanical linkage may be directly integrated into the fluid container. For instance, the fluid container may comprise a gas piston that expands or contracts.

Electromechanical generator 20A, 20B may for example include a rotor/stator arrangement, a flywheel, and/or any other known system for converting mechanical energy to electrical energy. In another embodiment, the expanding or contracting fluid may be passed through a turbine or turbomachine to generate electrical energy.

Once generated, the electrical energy is transmitted via a conductor 30A, 30B back to the platform 12. Conductor 30A, 30B may be integrated into cable 22, or be implemented separately. At the platform 12 the electrical energy may be utilized in any manner for any purpose, e.g., it may be stored in a battery 34 or capacitor; fed into a transformer; consumed on the platform 12 by another system (e.g., water purification, drilling, etc.), and/or transmitted via a transmission line 32.

Vessels 14A,B may be manufactured from any material, e.g., steel, composites, etc. The area between the vessel walls and pliable container may form a vacuum. Additionally, the overall mass of the vessels 14A,B is generally greater than the buoyancy necessary to keep each vessel afloat. Thus, each vessel 14A,B will have a propensity to sink at a desired rate of descent.

It is understood that for the purposes of this invention, electrical energy may be generated from a change in atmospheric pressure using any now known or later developed technology. For instance, a vibrating membrane may be utilized within each vessel to generate current from a change in pressure being exerted on such a membrane.

Further, a moving diaphragm may be utilized that incorporates materials whose crystals develop an electric charge when pressure is exerted thereon. Quartz, tourmaline and Rochelle salts are known examples of such materials. In such an embodiment, a pair of metal plates having crystal material there between can be utilized to generate an electrical charge when pressure is exerted on the plates. Other solutions may incorporate electro-chemical or thermo-electrical systems. Such alternative technologies may not require a mechanical linkage as described herein.

Storage of the fluid in pliable container 28A,B can be adiabatic, diabatic or isothermal in order to manage the heat gain and loss that occurs during compression and expansion.

Further, although shown submerged in a body of the water such as an ocean or lake, the systems described herein could be submerged in any body of water. For instance, such a system could be implemented in an abandoned mine shaft that has been sealed and flooded with water; a water filled shaft in a skyscraper, etc.

Figure 2:
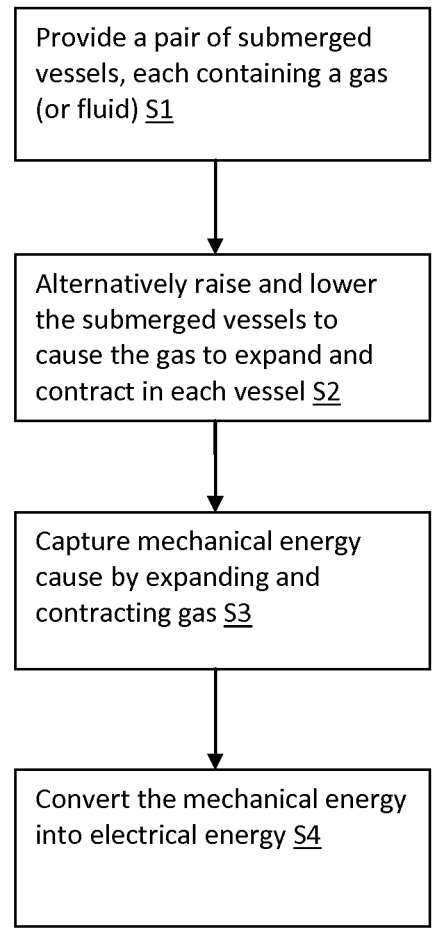
FIG. 2 depicts a flow diagram of a method of generating energy in accordance with an embodiment of the present invention.

Referring now to FIG. 2, a flow diagram is shown describing a method of generating energy. At S1, a pair of submerged vessels is provided, each containing a gas (or fluid). At S2, the submerged vessels are alternatively raised and lowered beneath the water surface to cause the fluid in each to expand and contract. At S3, mechanical energy is captured from the expanding and contracting gas, and at S4, the mechanical energy is converted to electrical energy.

Figure 3:
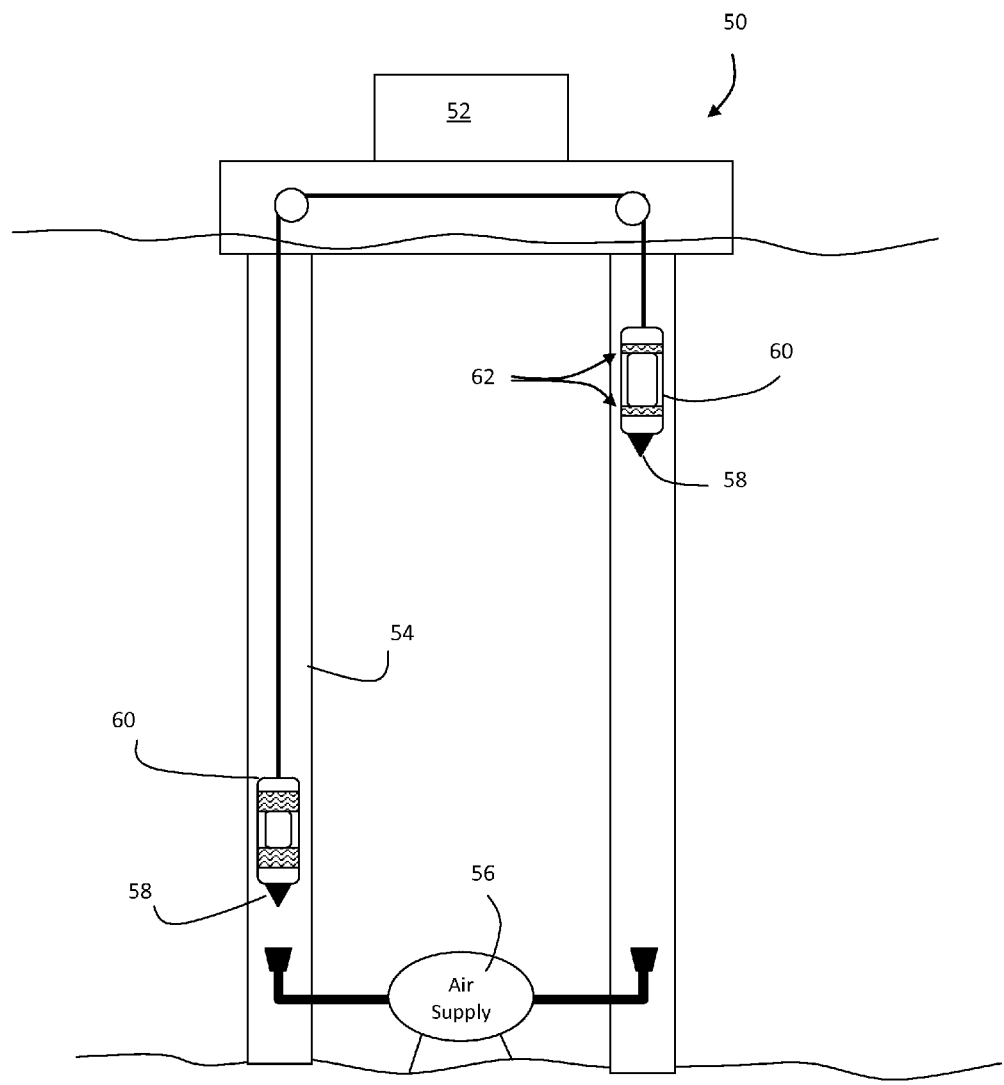
FIG. 3 depicts an alternative power management system in accordance with an embodiment of the present invention.

FIG. 3 depicts an alternative embodiment of an underwater energy management system 50 that includes a rigid or semi-rigid structure 54 for guiding vessels 60 up and down in the water. In this embodiment, a submerged air supply 56 may be provided to feed air to a buoyancy tank 58 affixed to each vessel 60 when the vessel reaches the bottom of the descent. The addition of the air into buoyancy tank 60 helps raise the tank upward. When the tank reaches the top of its ascent, the air from the buoyancy tank can be released.

In addition, in this illustrative embodiment, each vessel 60 includes a moving diaphragm 62 for generating electricity from applied pressure. The resulting electricity is delivered via wiring (not shown) to a storage or transfer facility 52. It is understood that the moving diaphragm 62 could be replaced with any other type of electricity generation system.

Figure 4:
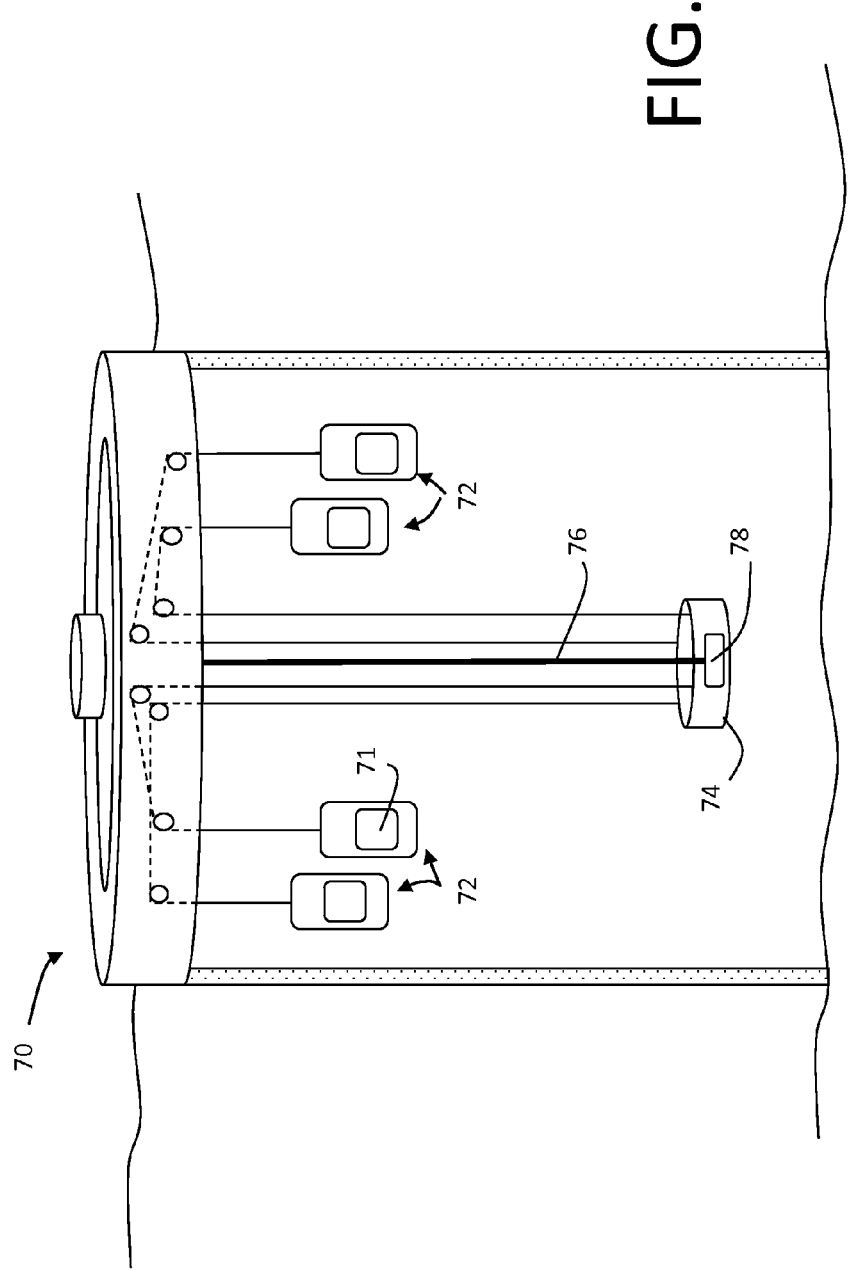
FIG. 4 depicts a further alternative power management system in accordance with an embodiment of the present invention.

FIG. 4 depicts a further embodiment that utilizes a ring structure 70 and central counterbalance 74 to raise and lower a plurality of vessels 72. Like the previous embodiments, each vessel is equipped with a mechanism 71 for generating electricity in response to expanding and/or contracting fluids. In FIG. 4, a set of four vessels 72 are depicted; however it is understood that the set may comprise any number of vessels 72 (i.e., one or more). As shown, the central counterbalance 74 provides a commensurate amount of weight to offset the weight of the vessels 72 to raise and lower the vessels 72 with a minimal amount of force. An air hose 76 may be utilized to pump air to a buoyancy tank 78 in the central counterbalance 74 to add buoyancy for ascent. Similar to the embodiment of FIG. 3, the air can be released at the top of the ascent of the central counterbalance 74. Further, a submerged air supply could alternatively be used to feed tank 78.

Figure 5:
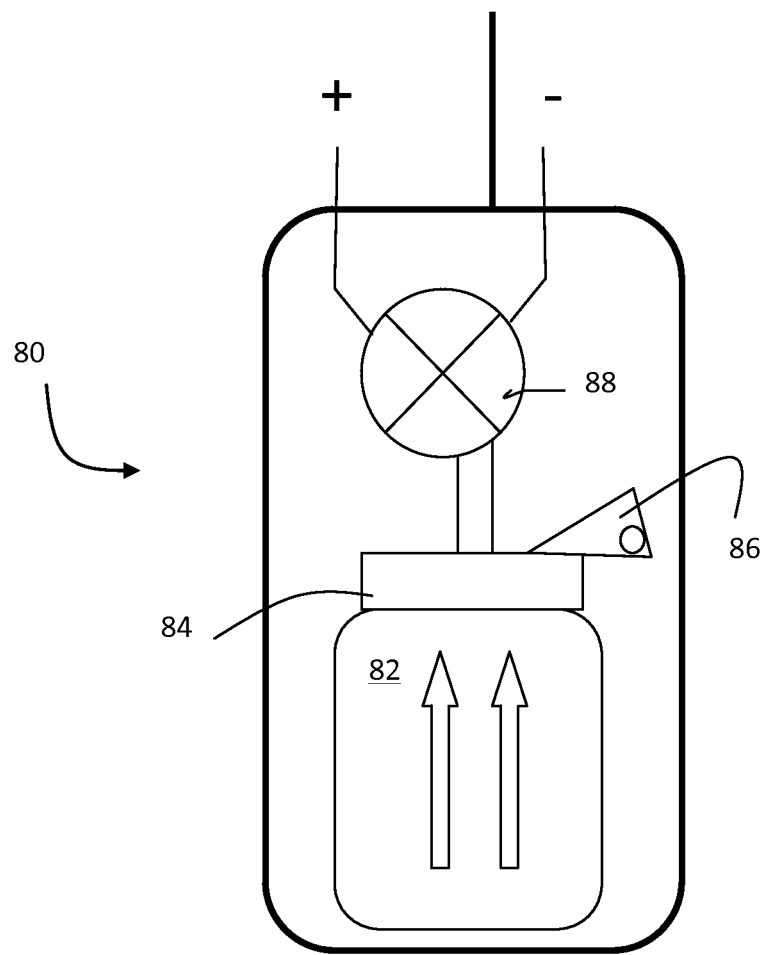
FIG. 5 depicts a vessel for use in a power management system in accordance with an embodiment of the present invention.

FIG. 5 depicts an illustrative vessel 80 suitable for use within the systems described herein. In this example, vessel 80 has an expandable (e.g., pliable) tank 82 that expands upwardly in response to the vessel 80 ascending in water. An expansion plate 84 is provided that moves upwardly in response to the expansion, which in turn drives a generator 88 to generate electricity. In this case, expansion plate 84 is lock in place by locking mechanism 86, which can be actuated to hold, release, or gradually release expansion plate 84. When the expansion plate 84 is held in place as the vessel 80 ascends, the pressure in expandable tank 82 greatly increases. Accordingly, a heightened amount of pressure can be exerted to generate higher levels of electricity. A similar arrangement may be utilized to capture compression forces during descent.

Figure 6:
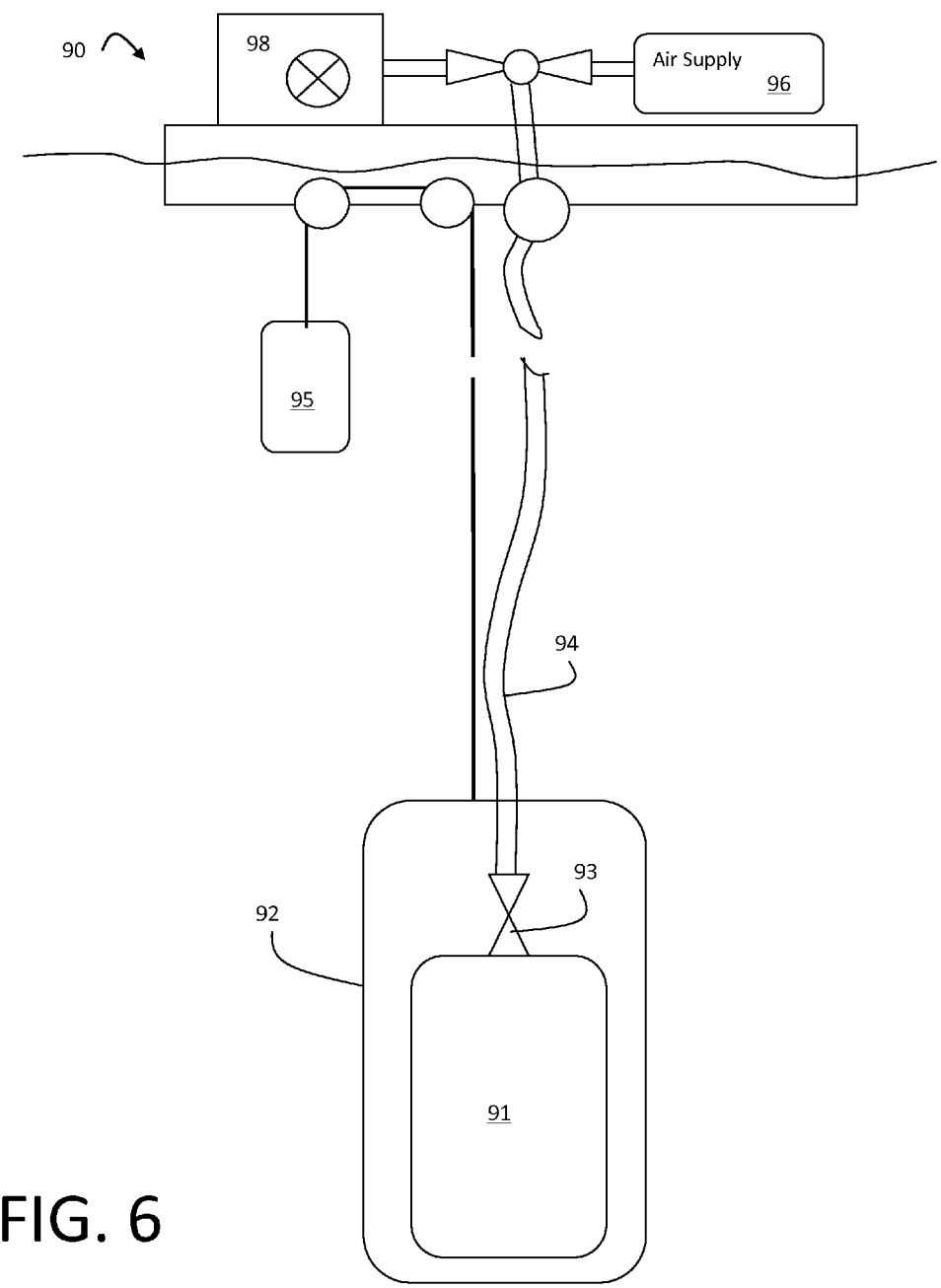
FIG. 6 depicts a further alternative power management system in accordance with an embodiment of the present invention.

FIG. 6 depicts a further embodiment 90 in which an electricity generation system 98 is located outside the vessel 92. In this case, a pressure tank 91 is linked via a controllable valve 93 to a retractable hose member 94 that runs externally to the vessel 92 up to the water surface. During a power generation phase, e.g., during ascent, high pressure air is release from the internal tank 91 through the retractable hose member 94 and to the electricity generation system 98. Any known system can be used to convert the flow of high pressure air to electricity. During a resupply phase, e.g., at the top of the ascent, air supply 96 can be utilized to resupply pressure tank 91. Note that a second vessel 95 could include a similar arrangement (not shown). Furthermore, this type of arrangement could be implemented in a configuration that utilizes a counterbalance such as that shown in FIG. 4.

Note also that FIGS. 1-6 depict various embodiments that utilize various alternative arrangements and features. Such arrangements and features can be mixed and matched among the different embodiments.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A system for managing energy, comprising:
   a pair of submerged vessels, each vessel containing a fluid;
   a mechanism for alternatively raising and lowering the vessels to cause the fluid to expand and contract;
   a system, contained within each submerged vessel, for capturing mechanical energy resulting from at least one of an expansion or contraction of the fluid; and
   a device contained within each submerged vessel, for converting the mechanical energy to electrical energy within the submerged vessel, wherein the device is selected from a group consisting of an electromechanical generator, a moving diaphragm and a vibrating membrane.

2. The system of claim 1, wherein each vessel includes a pliable container within the vessel for holding the fluid.

3. The system of claim 1, wherein the fluid comprises air.

4. The system of claim 1, wherein the mechanism for alternatively raising and lowering the vessels includes a buoyancy tank affixed to each vessel, wherein the buoyancy tank is adapted to receive a temporary air supply to increase buoyancy during ascent.

5. The system of claim 1, wherein each vessel includes a locking mechanism for selectively preventing expansion of the pliable container.

6. A method for generating energy, comprising:
   providing a pair of submerged vessels, each submerged vessel containing a fluid;
   alternatively raising and lowering the submerged vessels to cause the fluid to expand contract; and
   capturing mechanical energy within each submerged vessel resulting from at least one of an expansion or contraction of the fluid;
   converting the mechanical energy to electrical energy within each submerged vessel; and
   transmitting the electrical energy away from each submerged vessel via a conductor.

7. The method of claim 6, wherein each vessel includes a pliable container within the vessel for holding the fluid.

8. The method of claim 6, wherein the fluid comprises air.

9. The method of claim 6, wherein alternatively raising and lowering the vessels includes:
   providing a buoyancy tank affixed to each vessel, filling the buoyancy tank with a temporary air supply to increase buoyancy during ascent.

10. The method of claim 6, wherein each vessel includes a locking mechanism for selectively preventing expansion of the pliable container.

11. The method of claim 6, wherein converting the mechanical energy to electrical energy is accomplished with an electromechanical generator.

12. The method of claim 6, wherein converting the mechanical energy to electrical energy is accomplished with a device selected from the group consisting of a moving diaphragm and a vibrating membrane.

13. A system for generating energy, comprising:
    at least one submerged vessel, each at least one submerged vessel containing a fluid;
    a counterbalance coupled to each at least one submerged vessel;
    a mechanism for alternatively raising and lowering each at least one submerged vessel and the counterbalance to cause the fluid to expand and contract;
    a system, contained within each submerged vessel, for capturing mechanical energy resulting from at least one of an expansion or contraction of the fluid;
    a system, contained within each submerged vessel, for converting the mechanical energy to electrical energy; and
    a conductor coupled to each submerged vessel that transmits the electrical energy away from the submerged vessel.

14. The system of claim 13, wherein each of the at least one vessels includes a pliable container within the submerged vessel for holding the fluid.

15. The system of claim 13, wherein the at least one vessel comprises a plurality of vessels arranged around a ring with the counterbalance located in the center of the ring.

16. The system of claim 13, wherein the mechanism for alternatively raising and lowering the vessels includes a buoyancy tank affixed to the counterbalance, wherein the buoyancy tank is adapted to receive a temporary air supply to increase buoyancy during ascent.

17. The system of claim 13, wherein each vessel includes a locking mechanism for selectively preventing expansion of the pliable container.

18. The system of claim 13, wherein the system for converting the mechanical energy to electrical energy includes a device selected from the group consisting of an electromechanical generator, a moving diaphragm and a vibrating membrane.

* * * * *